May 28, 1957  F. O. LUENBERGER  2,793,714
LUBRICATION SYSTEM FOR ENCLOSED TRANSMISSION MECHANISM
Filed Sept. 28, 1953  4 Sheets-Sheet 1

FREDERICK O. LUENBERGER
INVENTOR.

BY John Flam
ATTORNEY

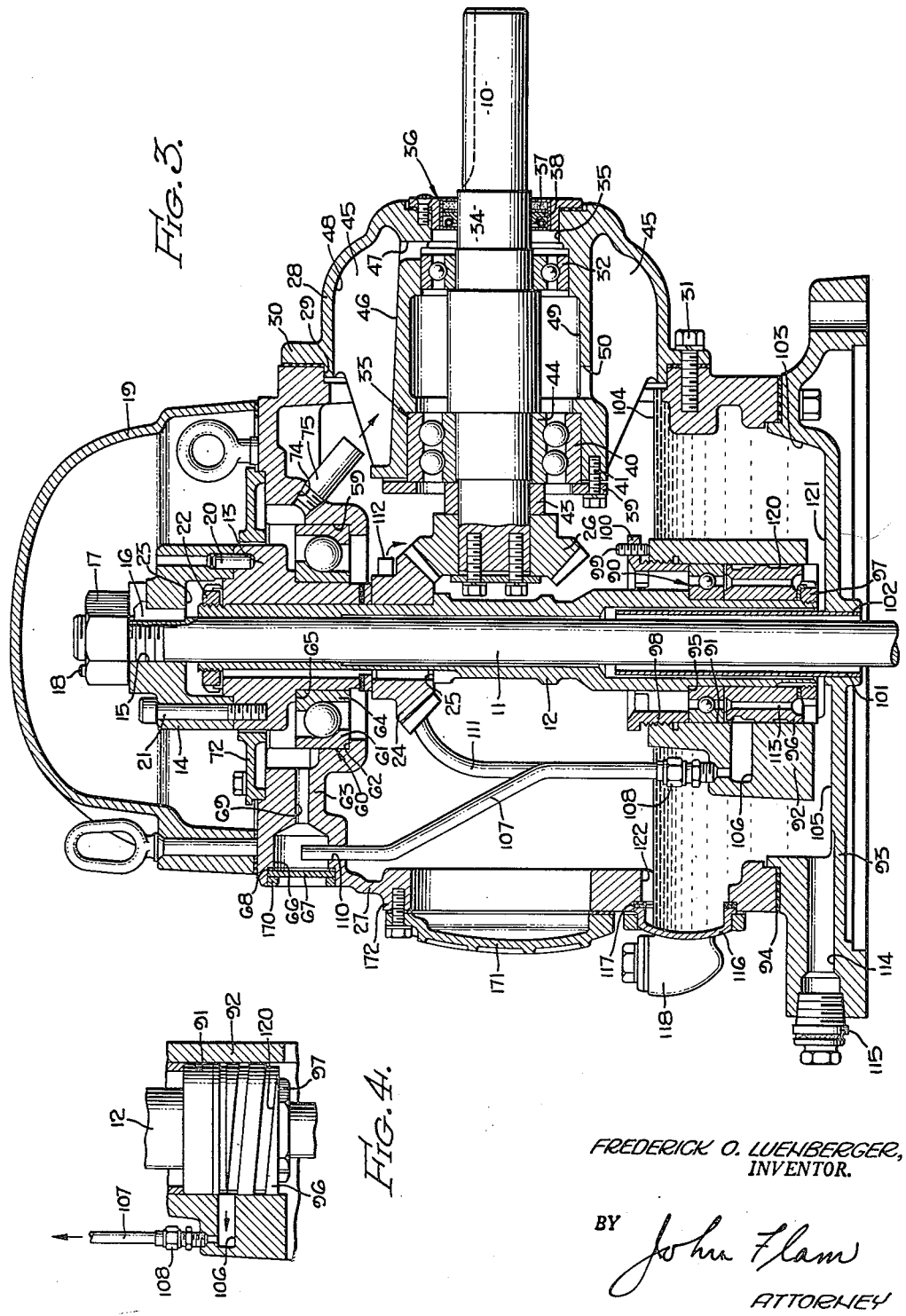

FREDERICK O. LUENBERGER
INVENTOR.

BY John Flam
ATTORNEY

May 28, 1957 F. O. LUENBERGER 2,793,714
LUBRICATION SYSTEM FOR ENCLOSED TRANSMISSION MECHANISM
Filed Sept. 28, 1953 4 Sheets-Sheet 4

FREDERICK O. LUENBERGER
INVENTOR.

BY John Flam
ATTORNEY.

United States Patent Office 2,793,714
Patented May 28, 1957

2,793,714

LUBRICATION SYSTEM FOR ENCLOSED TRANSMISSION MECHANISM

Frederick O. Luenberger, Los Angeles, Calif., assignor to U. S. Electrical Motors, Inc., Los Angeles, Calif., a corporation of California Application September 28, 1953, Serial No. 382,732

8 Claims. (Cl. 184—6)

This invention relates to a right angle power transmission mechanism, and particularly to a lubrication system therefor.

It is an object of this invention to provide a lubrication system utilizing a single reservoir to supply all portions of the transmission mechanism with lubricant. Use is made of a lubricant pump supplying conduits leading to structures remote from the reservoir, and appropriate sloping surfaces leading to other structures to be lubricated and supplied by the conduits.

It is another object of this invention to provide an improved cooling system for the lubricant. A water jacket is provided that is made up of parts readily disassembled for purposes of cleaning. For this purpose, the casing has integrally formed thereon an annular downwardly opening channel forming an annular space when the channel cooperates with a base plate of the mechanism.

It is another object of this invention to make it possible to observe not only the level of lubricant in the reservoir, but also to make it possible to observe the circulation of lubricant remote from the reservoir.

It is another object of this invention to provide a lubrication system in which lubrication is provided for the bearings immediately upon operation of the transmission, even before the lubricant pump is effective.

It is still another object of this invention to provide a novel fan structure for passing cooling air over the exterior of the transmission casing.

It is still another object of this invention to provide a novel structure for preventing reversal of the driven shaft when a driving torque is no longer applied. For this purpose, a novel ratchet type construction is provided, utilizing restraining balls that are normally freely movable upon the application of a driving torque.

This invention possesses many other advantages, and has other objects which may be made more clearly apparent from a consideration of several embodiments of the invention. For this purpose, there are shown a few forms in the drawings accompanying and forming part of the present specification. These forms will now be described in detail, illustrating the general principles of the invention; but it is to be understood that this detailed description is not to be taken in a limiting sense, since the scope of the invention is best defined by the appended claims.

Referring to the drawings:

Fig. 3 is a longitudinal sectional view corresponding to line 3—3 of Fig. 2;

Fig. 4 is a fragmentary view, partly in section, showing a portion of the apparatus shown in Fig. 3;

Figure 1:
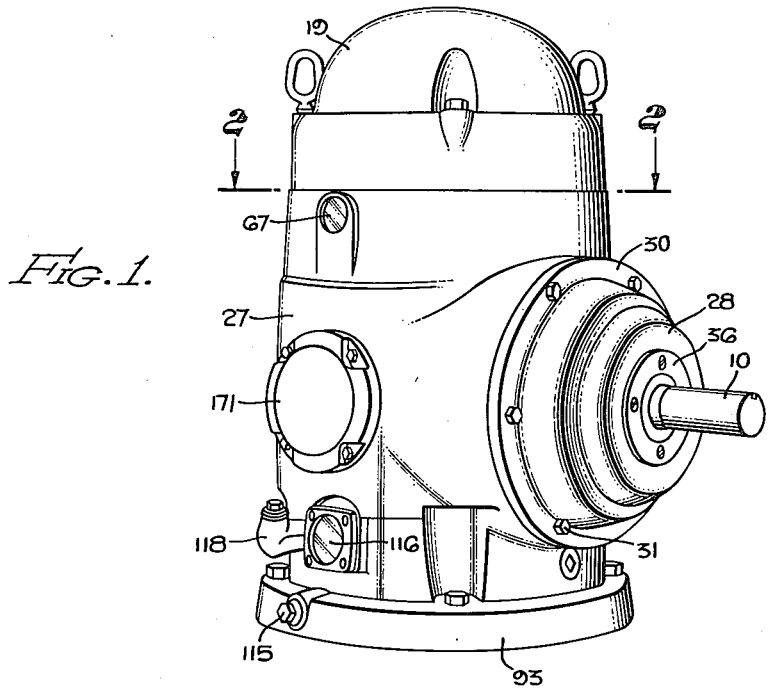
Figure 1 is a perspective view of a transmission mechanism incorporating the present invention.
Figure 2:
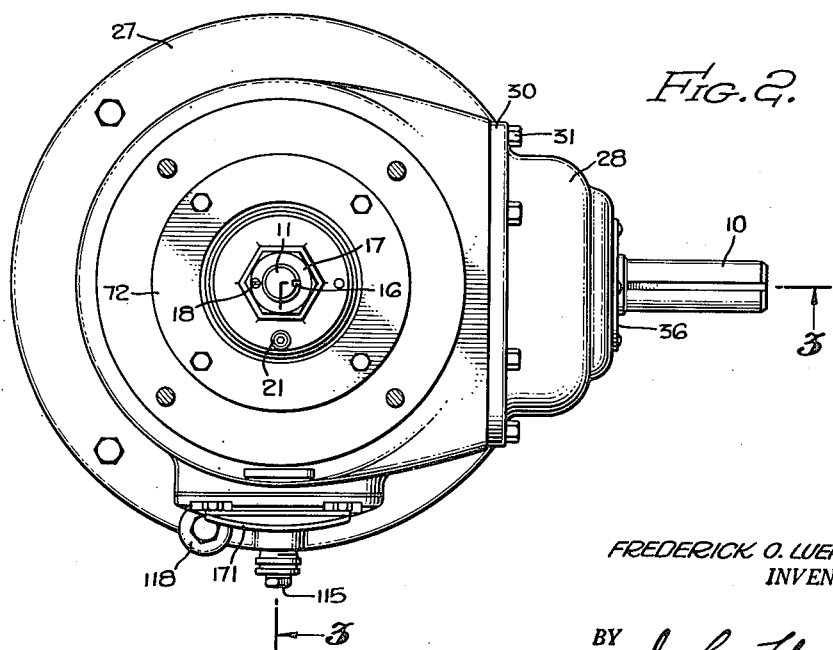
Fig. 2 is a sectional view, taken along the plane indicated by line 2—2 of Fig. 1.

In the form illustrated in Fig. 3, a horizontal shaft 10 is adapted to be suitably connected to a source of rotary motion. The horizontal orientation of the shaft 10 is intended to facilitate operation of the device from an internal combustion engine or equivalent source of power. Optionally, an electric motor could be provided for this purpose.

The shaft 10, through mechanisms to be hereinafter more fully described, imparts rotary motion to a vertical shaft 11. This shaft 11 may be connected, for instance, to a pump, or the like, operating in a well. The shafts 11 and 10 are rotatably coupled by the aid of a hollow shaft 12 that is in telescoping relationship with the driven shaft 11.

A coupling connection between the hollow shaft 12 and the driven shaft 11 is effected by the aid of through apertured coupling members 13 and 14. The lower coupling member 13 is connected as by a spline to the hollow shaft 12. The inner driven shaft 11 extends beyond the upper end of the hollow shaft and passes through a central aperture 15 of the upper coupling member 14. A spline 16 rotatably couples the driven shaft 11 to the upper coupling member 14.

A lock nut 17, engaging appropriate threads on the end of the driven shaft 11, adjustably determines the longitudinal position of the driven shaft 11. The lock nut 17, after adjustment, is held against relative rotation by the aid of a screw 18. The nut 17, being at the uppermost portion of the rotating mechanism, is accessible for adjustment even during operation of the transmission mechanism. This is particularly desirable for the purpose of positioning the pump impellers during the existence of conditions intended to be overcome, ensuring better and quicker adjustment and obviating temporary cessation of operations. To render the nut 17 accessible, an upper bell cover 19 is removably mounted on the main casing structure 27, and may be made of cast aluminum for facilitating handling.

The coupling members 13 and 14 are rotatably connected by the aid of a series of pins 20 extending between opposed engaging surfaces of the members. A bolt 21 is also provided.

The hollow shaft 12 extends just above the lower coupling member 13. A lock nut 22, extending in a lower recess 23 of the upper coupling member 14, and carried at the upper end of the hollow shaft 12, engages the upper surface of the coupling member 13 to limit downward movement of the hollow shaft.

The hollow shaft 12 carries a bevel gear 24 between a shoulder 25 of the hollow shaft 12 and the lower surface of the coupling member 13. A spline connection is provided between the bevel gear 24 and the hollow shaft 12. A corresponding bevel gear 26, in engagement with bevel gear 24, is carried at the innermost end of the driving shaft 10. A driving connection is thus effected through the bevel gears 26, 24, the hollow shaft 12, coupling members 13 and 14, and the spline 16 to the inner driven shaft 11.

A bracket 28, surrounding the driving shaft 10 and detachably secured to the casing 27, mounts suitable bearing structures 32 and 33 for the horizontal driving shaft 10. For this purpose, the bracket 28 is telescopingly received in an aperture 29 of the casing 27. A peripheral flange 30 of the bracket 28 overlies that portion of the casing 27 adjacent the aperture 29. Fastening bolts 31 extend through the flange 30 for detachably securing the bracket 28 to the casing 27.

A seal structure 36 is provided between the bracket 28 and that cylindrical area 34 of the shaft 10 that is opposite the end aperture 35 of the bracket 28 through which the shaft 10 passes. In the present instance, the seal structure 36 incorporates stationary absorbent annular elements 37 and 38 in wiping contact with the surface 34.

The bearing structures 32 and 33 are accommodated in the tubular portion of the bracket 28, the bracket 28 having appropriate shoulders defining limiting longitudinal positions thereof. The outer bearing 32 is retained by a shoulder of the shaft 10. The inner bearing structure is retained by a spacer 43 on the shaft 10 between the gear 26 and the inner race of the bearing 33, and an apertured circular plate 39 engaging the outer race 40.

The plate 39 is clamped to the bracket 28 by the aid of bolts 41. There is ample spacing between the spacer 43 and the plate 39 to ensure that the space between the races 40 and 44, in which the bearing elements are located, is accessible to the interior of the casing. This is important in connection with the lubrication system, which will be described more fully hereinafter.

The tubular portion of bracket 28 projects inwardly from the outer cover portion thereof. A series of ribs 45, angularly spaced about the axis of the bracket 28 and the shaft 10, provides suitable rigidity for the bracket structure 28. Two adjacent ribs 45, uppermost of the bracket 28, define a space 48 exposed to the interior of the casing 27 and adapted to receive lubricant in a manner to be described more fully hereinafter.

A bearing structure 60 for the upper portions of the shafts 11 and 12 is provided. The outer race 61 of the bearing 60 abuts an upwardly facing annular shoulder 62 that extends inwardly of a central aperture 59 of the top wall 63 of the casing 27. The inner race 64 abuts an annular downwardly facing shoulder 65 of the lower connecting member 13.

The present arrangement permits maintenance or replacement of the bearing structure 60 without dismantling the gear mechanisms 24 and 26 and without removal of either of the shafts 11 and 12. In order that the bearing 60 be removed, the bell cover 19 is detached from the casing 27. The coupling members 13 and 14 can then be removed after the nuts 17, 22 and bolt 21 are removed. The shafts 11 and 12 are restrained, by other portions of the apparatus, from any substantial downward movement even when these members 13 and 14 are removed. The bearing 60 can now be lifted from the top wall 63.

A base plate 93 cooperates with the casing 27 to complete the enclosure for the mechanism. The lower end of the casing 27, with the interposition of a sealing gasket 94, engages an annular surface of the base 93. Bolts are provided for securing these casing parts 93 and 27 together.

A radial bearing structure 90 for the lower end of the hollow shaft 12 is received in a through central aperture 91 of an upwardly extending boss 92 of the base plate 93.

The bearing structure 90 is positioned with respect to the hollow shaft by the aid of a downwardly facing shoulder 95 extending peripherally of the hollow shaft 12. A spiral pump 96, secured to the hollow shaft 12 as by a spline connection, and to be described more fully hereinafter, cooperates with the shoulder 95 properly to position the bearing structure 90. A lock nut 97 on the lower end of the shaft determines the axial positioning of the pump member 96. An adjustable retaining member 98, in threaded engagement with the upper end of the boss aperture 91, engages the outer race of the bearing 90 to prevent upward movement of the bearing 90 and hollow shaft 12 with respect to the casing. The retaining member 98 has a peripheral flange 100 in superposed relationship with the end of the boss 92. One or more set screws 99, passing through the flange 100, engage the end of the boss 92 to secure the adjusted position of the retainer 98.

The upwardly extending boss 92 of the base plate 93 defines with the casing 27 a substantially annular lubricant reservoir 103. The level 104 of the reservoir extends below the top of the boss 92. From this reservoir 103 lubricant is distributed to all of the bearing structures 60, 32, 33 and 90, as well as the engaging bevel gear elements 24 and 26.

The spiral pump 96 serves as a means whereby lubricant from the reservoir 103 is carried to those rotating structures above the level 104. The spiral gear pump 96 (Fig. 4) has a continuous helically arranged groove 120 at its periphery. Lubricant from the reservoir 103 communicates with the lower terminal portion of the groove 120 by the aid of horizontal passageways 105 and 121 of the boss 92, extending into the boss aperture 91 in which the pump 96 is accommodated. An incremental pressure is added to this lubricant as it is caused to move upwardly between the walls of the boss aperture 91 and the walls of the groove 120. A passageway 106 receives the lubricant carried by the groove 120 to the upper part of the pump 96 and forms the outlet therefrom. For this purpose, the passageway 106 extends into the boss aperture 91.

Conduit means 107 and 111, which may be made of flexible copper tubing or the like, communicate with the outlet passageway 106 by the aid of suitable couplings 108 and carry the pressurized lubricant to the rotating parts above the reservoir 103.

The conduit 111 has a terminal portion 112 adjacent the area of interengagement of the bevel gears 25 and 26. Accordingly, lubricant is discharged at this area to provide appropriate lubrication for these gear elements.

Lubricant for the bearing 33 is also provided from the discharge end 112 of the conduit 111. This is accomplished by passage of lubricant axially of the shaft 10 and gear member 26 and through the annular space defined by the plate 39 and spacer 43 to the interior of the bearing 33. Such flow of lubricant may occur either directly from the conduit terminus 112 or from the splashing of the lubricant produced at the area of interengagement of the gear members 24 and 26.

The other conduit 107 carries lubricant to the bearing structures 60 and 32. For this purpose, the conduit 107 projects into a substantially cylindrical chamber 66 formed radially in the outer portion of the top wall 63 of the casing. An appropriate aperture 110 is provided in the top wall 63 for the passage of the conduit 107. A radially extending passageway 69 of the top wall 63 establishes communication between the chamber 66 and the recess 59 in which the bearing 60 is accommodated. Lubricant may accordingly pass from above the bearing 60, thence past the operative elements thereof, and finally through the end of the aperture 59 of the top wall 63 and thence back to the lubricant reservoir 103. An annular bracket 72, secured to the top of the wall 63, surrounds the coupling member 13 with only slight clearance, and thus closes the space for lubricant above the bearing 60. This may aid in preventing contamination of the lubricant should the bell cover 19 be removed for purposes of adjusting either nuts 17 or 22.

A portion of the lubricant supplied to the chamber 66 is diverted for providing lubrication for the bearing structure 32 for the shaft 10. For this purpose, a short conduit 75 is in communication with the space defined by the top wall 63 and bracket 72 above the bearing structure 60. The conduit 75 is in threaded engagement with a transverse aperture 74 of the top wall.

The discharge end of the conduit 75 lies above the tubular portion of the bracket 28. Accordingly, lubricant is discharged in the space 48 defined by adjacent ribs 45 of the bracket 28. The surface 46, forming the bottom wall of the space 48, inclines downwardly in the direction toward the bearing structure 32. An aperture 47 of the bracket 28 establishes communication between the space 48 and the interior of the bearing structure 32. Accordingly, lubricant is supplied for the bearing structure 32.

The tubular portion of the bracket 28 defines with the input shaft 10 an annular space 49 intermediate the bearing structures 32 and 33. This space 49 communicates with the opposed ends of these respective bearings. This space 49 may receive whatever lubricant passes axially through these bearings. An aperture 50 in the lower portion of the tubular portion of the bracket 28 establishes communication between the annular space 49 and the lubricant reservoir 103. Accordingly, the lubricant passing through the bearings 32 and 33 ultimately returns through the reservoir 103.

The chamber 66, forming an intermediate source of supply of lubricant for bearings 60 and 32, is closed by a transparent window 67 on the exterior of the casing 27. A suitable sealing gasket 68 may be provided, held in place by a ring 170 pressed into the opening. This window 67 serves as a means for visually ascertaining during operation that the pump 96 is properly operating to supply lubricant. When the mechanism is stopped, the level of lubricant in the chamber 66 should normally recede. If this is not the case, or if it takes too long a period for the level to fall, then it is apparent that the passageways downstream of the chamber 66 are not properly discharging.

In order to ensure against passage of lubricant from the reservoir 103 axially downwardly of the shafts, an upwardly extending non-rotary sleeve 101 is provided. This sleeve 101 is in sealing relationship with a restricted portion 102 of the boss aperture 91, and through which the shaft 11 extends. The sleeve 101 extends with substantial clearance between the hollow shaft 12 and the driven shaft 11. To permit clearance, the inner diameter of the lowermost portion of the hollow shaft 12 is substantially enlarged. Appropriate sealing relationship for the reservoir 103 is thereby entirely independent of both the shaft 11 and the hollow shaft 12. Accordingly, these shafts may, if desired, be removed without disrupting the reservoir 103.

A fixture 118, projecting outwardly of the casing 27, forms the means whereby the lubricant of the reservoir 103 may be replenished. The casing 27 has an aperture 122, the upper limit of which lies above the full level 104 of the reservoir 103. This aperture 122 is closed by a transparent window 116 with the interposition of suitable sealing gaskets 117. This window 116 thus serves as a means of visually ascertaining the level of the lubricant reservoir 103. The window may have suitable markings thereon.

The lubricant may be drained from the reservoir, such as may become necessary after continued operation. For this purpose, a passageway 114 in the base plate 93 is provided that communicates with the reservoir 103 and the exterior of the plate 93. A plug 115 normally closes the passageway 114.

Lubricant is supplied to the lower bearing 90 simply by providing a flow path thereto from the reservoir 103, this bearing 90 normally being substantially below the level 104. To accomplish this purpose, the spiral gear 96 immediately beneath the bearing 90 has two through axially extending passageways 113. These passageways 113 communicate with the supply passageways 105 and 121 at their lower ends, and register with the space between the race elements at the upper ends of these passageways. Accordingly, lubricant is provided for the bearing 90.

A ribbed cover plate 171 is fastened to the boss 172 defining an access aperture to the interior of the casing. An appropriate sealing gasket is provided.

Figure 5:
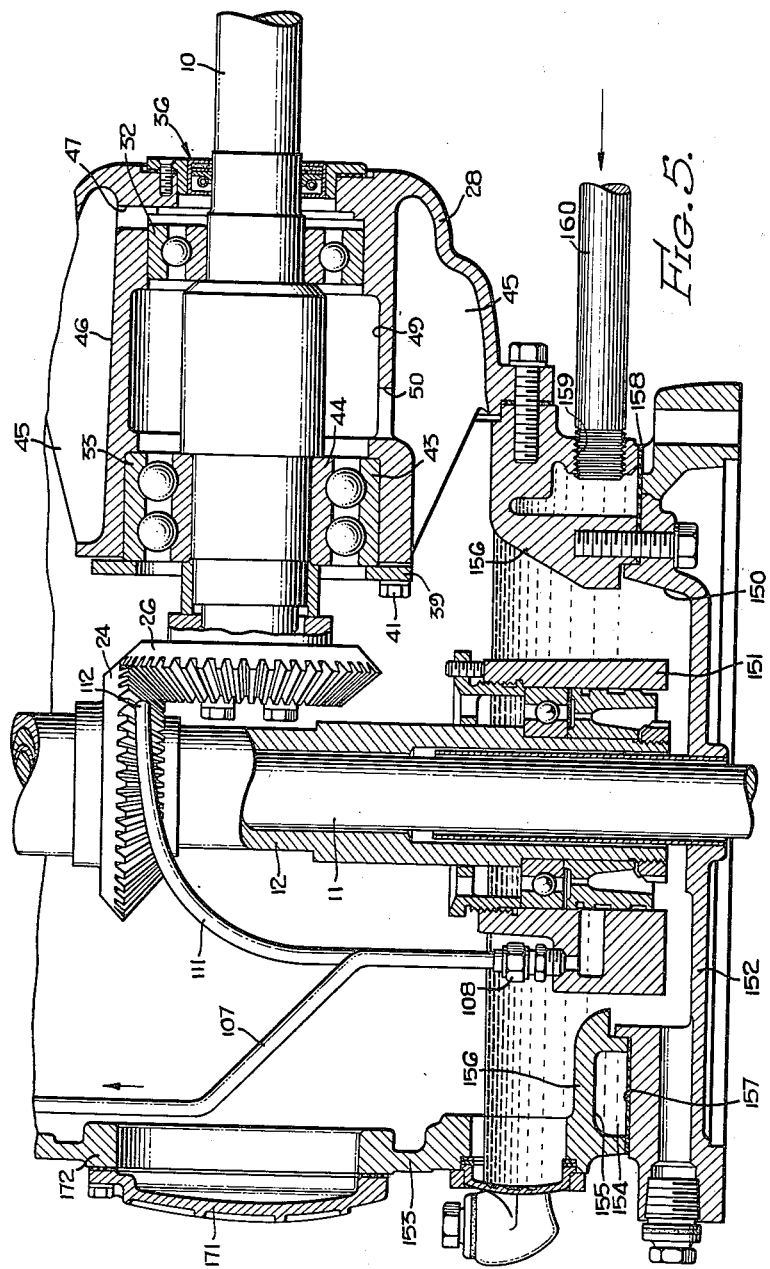
Fig. 5 is a sectional view of a modified form of the present invention.

In the form illustrated in Fig. 5, a slightly different arrangement is provided. The arrangement of the hollow shaft 12, driven shaft 11, gear elements 24 and 26, driving shaft 10 and bearing structures 32 and 33 is as in the previous form.

The reservoir 150 is formed by an upwardly extending boss 151 of a base plate 152 for the casing. The base plate and the lower portion of the casing 153 have, in this instance, special provisions for providing a space or jacket 154 for circulating cooling water for the lubricant.

For this purpose, the upper surface of the base 152 has an annular surface 157 of substantial width. A circularly extending recess 155, opening downwardly of the casing 153, is provided in this lower end of the casing 153. Walls 156 of the casing 153 serve to define on opposite sides the lubricant reservoir 150 and the circular recess 154.

The annular surface 157 supports the casing 153. This surface 157 closes the downwardly extending circular recess 155, and together with the lower walls 156 of the casing 153, defines the space 154 separated from the reservoir. A suitable sealing gasket 158 is interposed between the base 152 and the end edges of the casing 153.

Water is circulated through this space 154. For this purpose, two conduits are provided that connect with threaded apertures of the casing 153. One of these conduits 160 is shown in Fig. 5 threadedly received in an aperture 159 of the casing. Conveniently one of the conduits may be supplied from a portion of the output of the pump which the mechanism operates.

The arrangement of the water jacket is such that it may be easily and effectively cleaned, such as to remove deposits of sand or other foreign particles. To accomplish this, the base plate 152 is detached, and the entire area of the space 154 is directly accessible.

Figure 6:
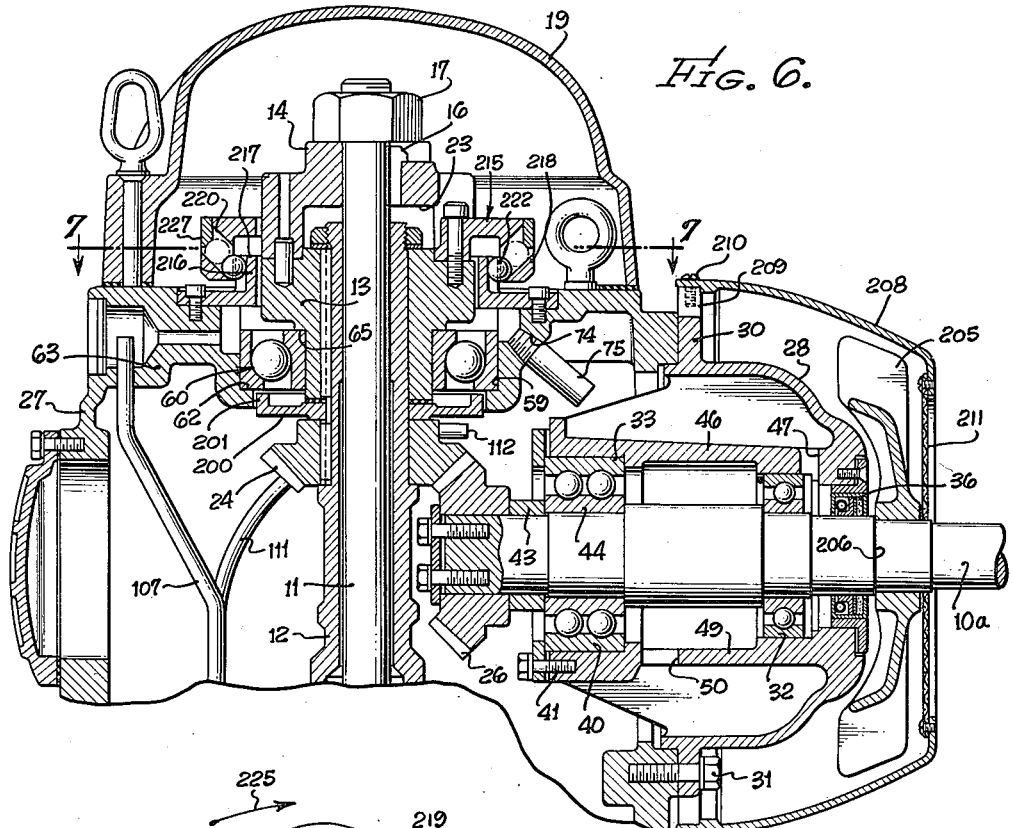
Fig. 6 is a fragmentary sectional view of a further modified form of the present invention.
Figure 7:
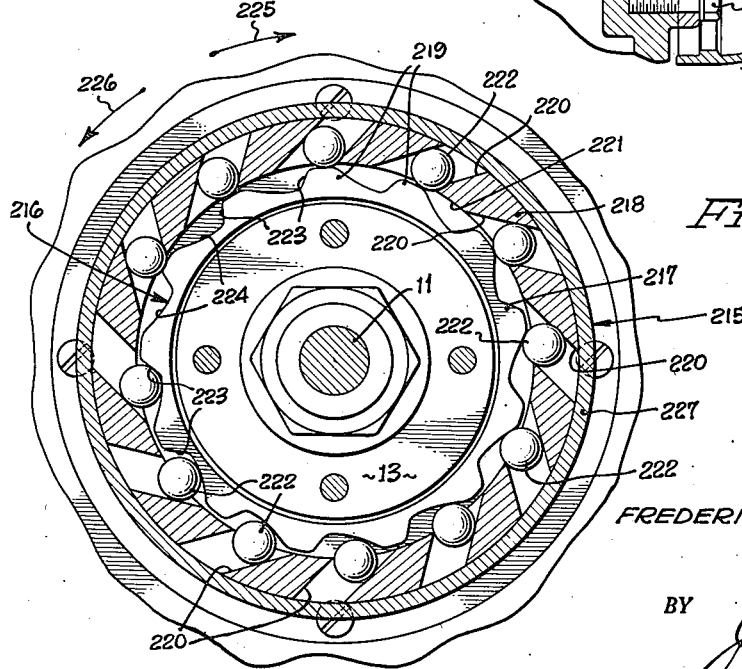
Fig. 7 is an enlarged sectional view, taken along the plane indicated by the line 7—7 of Fig. 6.

In the form shown in Figs. 6 and 7, the hollow shaft 12, the driven shaft 11 and bevel gear elements 24 and 26 are provided, as in the previous forms. The bearing structure 60 rests in an enlarged upper portion of the recess 59 of the top casing wall 63.

The initiation of operation of the system including the conduits 107 and the hydraulic lubricant pump has a certain amount of lag. In the present instance, provisions are made to provide lubrication for the bearing structure 60 immediately upon operation of the mechanism and before the pump passes lubricant through the conduit 107.

For this purpose, a rotary lubricant container 200 is provided. This lubricant container 200 is generally of cup-shaped configuration, having an upwardly extending peripheral flange 201. The flange 201 is accommodated with clearance in the lower reduced portion of the recess 59 beneath the intermediate shoulder 62. The container 20 is carried for rotation by the hollow shaft 12 and is interposed between the end of the lower coupling member 13 and bevel gear 24.

In the normal operation of the device, the lubricant passes axially downwardly of the bearing structure 60. Some of this lubricant is trapped by the cup-shaped container 200. The balance of the lubricant overflows the container 200 and passes between the periphery of the container member 200 and the lower portion of the top wall recess 59 back to the lubricant reservoir.

The member 200 thus contains a small quantity of lubricant when operation of the mechanism is interrupted. This quantity of lubricant is availed of upon initial operation of the mechanism. When rotation of the shaft 12 begins, this quantity of oil is urged upwardly into the bearing structure 60 by centrifugal force and deflection caused by the flange 201. Lubrication for the bearing 60 is provided in advance of the effective operation of the hydraulic pump system.

The container member 200 also serves to protect the bearing structure 60 from moisture in the casing 27 during periods in which the mechanism is not functioning, the container 200 forming a lower cover beneath the bearing 60.

A detachable fan unit is also provided in the present form for passing air over and along the exterior of the casing structure 27. For this purpose, a fan structure 205 is provided that may be carried by the driving shaft 10a exteriorly of the bracket 28. The driving shaft 10a has a shoulder 206 properly positioning the fan structure 205. The fan 205 is secured for rotation with the driving shaft 10a in an appropriate manner.

An open-ended hollow protective shield 208 extends about the fan structure 205 to direct the passage of air from the fan 205 along the bearing bracket 28 and the housing structure 27. The shield 208 is generally of frusto-conical form. It is mounted by the aid of three or more lugs 209 projecting radially outwardly from the flange 30, the lugs being received within the base of the shield 208. Screws 210 secure the shield 208 to the lugs 209.

A screen 211 is secured about that opening of the shield 208 adjacent the fan structure 205.

Air is urged through the space defined by the exterior surface of the bearing bracket 28 and the interior surface of the shield 208, the air passing into the shield past the screen 211 and out of the shield along the casing structure 27.

The fan 205 can be used as a supplement to or as a substitute for water cooling.

In the present form, there is shown an apparatus for preventing undesirable reverse movement of the driven shaft 11. For this purpose, a rotary and a non-rotary ratchet member 215 and 216 are provided. The rotary member 215 is carried for rotation by the coupling member 13 secured to the hollow shaft 12. The non-rotary ratchet member 216 is carried on the top wall 63 of the casing 27.

The non-rotary member 216 has an upwardly extending flange 217 extending within and spaced from a depending peripheral flange 218 of the rotary member 215. As shown most clearly in Fig. 7, the upwardly extending flange 217 is provided with a series of ratchet teeth 219 extending on the peripheral surface of the flange 217 opposed to the inner surface of the depending flange 218 of the rotary member 215. The depending flange 218 has a series of recesses 220 opening into the surface 221 thereof that is exposed to the ratchet teeth 219. Ball detents 222 cooperable with the teeth 219 are accommodated in each of the recesses 220.

As shown most clearly in Fig. 6, the recesses 220 are sufficiently inclined to the horizontal so that the weight of the ball detents 222 urges them inwardly toward the ratchet teeth 219.

As shown most clearly in Fig. 7, the recesses 220 are also each askew to the axis of the device by being inclined to a radial line extending therefrom toward the common axis of rotation of the structure. The counterclockwisemost surfaces of the recesses 220 are opposed to correspondingly inclined shoulders 223 of the ratchet teeth. The axis of the detent recesses 220 is substantially normal to the slightly sloping surfaces 224 of the ratchet teeth 219. The detents 222 may become wedged between the counterclockwisemost surface of their recesses 220 and a shoulder 223 without moving entirely beyond their recesses.

Such wedging takes place, for instance, upon relative movement between a shoulder 223 and its then opposed counterclockwisemost portion of a recess surface. Such movement takes place upon angular movement of the shaft 11 and rotary member 215 in the direction of the arrow 225. The reverse rotation is thus stopped before any substantial angular velocity is attained.

Correspondingly, when the shoulders 223 move away from the then opposed counterclockwisemost portion of a recess surface, the detents 222 may not become wedged but, on the contrary, are urged into their recesses 220 by the sloping surfaces of the ratchet teeth 219. Thus, rotation between the members is permitted in one relative direction, such as by rotation of the rotary member in the direction of the arrow 226. As soon as sufficient angular speed is attained, the balls 222 are urged by centrifugal force upwardly of the recesses 220 and out of contact with teeth 219.

The number of detents is prime with respect to the number of ratchet teeth. In the present instance, twelve ball detents 222 are provided, and thirteen ratchet teeth 219 are provided. Thus, for any position of the ratchet members, there are twelve relative positions of ball detents with respect to ratchet teeth. Thus, only one ball detent 222 may be in wedging relationship at a time.

For one-thirteenth of a revolution between the members, twelve detents pass in sequence through positions in which they might be wedged. Thus, for each revolution, there are one hundred and fifty-six sequential wedging possibilities. The maximum movement of the rotary ratchet member in the reverse direction is thus approximately two degrees of arc. On the average, the reverse movement of the rotary ratchet member permitted will be about one degree of arc.

The recesses 220 for the ball detents 222 are formed by providing through apertures in the flange 218 of the rotary ratchet mmeber 215. A press-fitted ring 227 is accommodated on the flange 218 to prevent movement of the detents 222 beyond the outer ends of these recesses 220, under the influence of centrifugal force.

Conveniently, the non-rotary ratchet member 216 provides the function of the annular bracket 72 described in connection with the previous forms. Thus, the lower surface of the non-rotary ratchet member 216 defines the space above the bearing structure 60 through which lubricant passes therefor.

The fan and casing structure, upper bearing and shaft coupling structure, and the reverse rotation device shown in Figs. 6 and 7 described herein are made the subject-matter of a divisional application Serial No. 637,345, filed December 31, 1956.

I claim:

1. In a device of the character described: a casing; a rotary vertical shaft; a bearing structure for the shaft and supported by the casing; and a base for the casing; said base and casing being formed as separate parts, and together forming a lubricant well in the casing for the bearing structure, said casing having a jacket cavity open at the bottom and closed by said base.

2. In a device of the character described: a casing; a rotary mechanism in the casing; said casing having wall means forming a channel opening exteriorly of said casing; and a plate detachably secured to said casing for closing said channel opening, said plate and casing together forming a lubricant well in the casing for the rotary mechanism, said plate also forming with said channel a space separate from the well extending about said lubricant well in which a cooling liquid may be circulated.

3. In a device of the character described: a vertical rotary shaft; a casing for the shaft, said casing having an opening at its lower end through which said shaft extends; said casing having wall means forming a downwardly opening channel extending continuously about said casing opening; and a base having a through aperture through which said shaft extends, said base being secured to said casing at said opening, said base having a surface overlying said wall means of said casing to form a space with said channel in which a cooling liquid may be circulated.

4. In a device of the character described: a vertical rotary shaft; a casing for the shaft, said casing having an opening at its lower end through which said shaft extends; said casing having wall means forming a downwardly opening channel extending continuously about said casing opening; and a base having a through aperture through which said shaft extends, said base being secured to said casing at said opening, said base forming a lubricant well at the lower end of said casing, said base having a surface overlying said wall means of said casing to form a space with said channel separate from and surrounding said well in which a cooling liquid may be circulated.

5. In a device of the character described: a vertical rotary shaft; a casing for the shaft, said casing having an opening at its lower end through which said shaft extends; said casing having wall means forming a downwardly opening channel extending continuously about said casing opening; a base having a through aperture through which said shaft extends, said base being secured to said casing at said opening, said base forming a lubricant well at the lower end of said casing, said base having a surface overlying said wall means of said casing to form a space with said channel separate from and surrounding said well in which a cooling liquid may be circulated; and a tubular member carried by said base at the aperture thereof and extending upwardly into said casing and in telescoping relationship with said shaft.

6. In a device of the character described: a pair of intermeshing bevel gears; a vertical shaft upon which one gear is mounted; a horizontal shaft upon which the other gear is mounted; a casing for the shafts and the gears, and defining a lubricant well in the bottom thereof; bearing structures above the well for the shafts respectively; means forming a space above the bearings and in communication with one of the bearing structures; conduit means from the well to said space; means operated upon rotation of one of the shafts for urging lubricant through the conduit; and conduit means having one end in said space and another end located beneath said one end for by-passing lubricant to the other of the bearing structures.

7. In a device of the character described: a pair of intermeshing bevel gears; a vertical shaft upon which one gear is mounted; a horizontal shaft upon which the other gear is mounted; a casing for the shafts and the gears, and defining a lubricant well in the bottom thereof; bearing structures above the well for the shafts respectively; said casing having means forming a space above the bearings and in communication with one of the bearing structures; said space opening laterally of the casing; a transparent window closing said lateral opening whereby the level of liquid in said space may be visually ascertained; conduit means from the well to said space and having an end located adjacent the window; means operated upon rotation of one of the shafts for urging lubricant through the conduit; and conduit means having one end in said space and another end located beneath said one end for by-passing lubricant to the other of the bearing structures.

8. In a device of the character described: a casing open at the lower end thereof; a rotary mechanism including a vertical shaft in the casing, and a hollow shaft, said vertical shaft extending through the open end; a bracket having an apertured boss surrounding said vertical shaft, said boss extending upwardly into said casing at said opening, and defining with said casing a substantially circularly extending lubricant well at the bottom thereof; said hollow shaft surrounding said vertical shaft, and terminating at its lower end in said boss aperture; a sleeve interposed between the shafts and extending upwardly from the lower terminus of said boss aperture to above the level of the well; a member secured to said hollow shaft and having helical peripheral walls spaced close to the walls of said boss aperture; means forming a passageway through the boss from the well to a place beneath said helical member; conduit means communicating with the boss aperture near the top of said helical member for passing lubricant to said mechanism; and a bearing structure for the hollow shaft in the boss aperture above said helical member, said bearing structure being beneath the top of said sleeve; said helical member having a restricted axial passageway for passing lubricant to the said bearing structure.

References Cited in the file of this patent
UNITED STATES PATENTS

| | | |
|---|---|---|
| 792,567 | Wright | June 13, 1905 |
| 2,067,123 | Hait | Jan. 5, 1937 |
| 2,239,986 | Blood | Apr. 29, 1941 |
| 2,240,118 | Matthews | Apr. 29, 1941 |
| 2,299,549 | Maier | Oct. 20, 1942 |
| 2,327,962 | Drake | Aug. 24, 1943 |
| 2,364,599 | Burrus | Dec. 12, 1944 |
| 2,368,963 | Boden | Feb. 6, 1945 |
| 2,372,026 | Smith | Mar. 20, 1945 |
| 2,481,914 | Eastman | Sept. 13, 1949 |
| 2,540,997 | Schmitter | Feb. 6, 1951 |
| 2,548,805 | Moir | Apr. 10, 1951 |
| 2,602,711 | Imshaug | July 8, 1952 |